US012679027B2

(12) United States Patent
Bukhari

(10) Patent No.: US 12,679,027 B2
(45) Date of Patent: Jul. 14, 2026

(54) MULTI-SCREW EXTRUDER FOR LARGE FORMAT 3D PRINTERS

(71) Applicant: SAUDI ARABIAN OIL COMPANY, Dhahran (SA)

(72) Inventor: Malik M. Bukhari, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 152 days.

(21) Appl. No.: 18/628,145

(22) Filed: Apr. 5, 2024

(65) Prior Publication Data

US 2025/0312967 A1     Oct. 9, 2025

(51) Int. Cl.
B29C 64/209 (2017.01)
B29B 7/46 (2006.01)
(Continued)

(52) U.S. Cl.
CPC .............. B29C 64/209 (2017.08); B29B 7/46 (2013.01); B29C 64/295 (2017.08);
(Continued)

(58) Field of Classification Search
CPC ... B29C 64/209; B29C 64/295; B29C 64/321; B29C 64/118; B29C 64/393;
(Continued)

(56) References Cited

U.S. PATENT DOCUMENTS 11,351,747 B2     6/2022  Clark
2005/0199093 A1 *  9/2005  Schmeink ............. B30B 11/241
74/665 GA (Continued)

FOREIGN PATENT DOCUMENTS

CA      2161207 A1 *  4/1996  ........... B29C 48/682
CN   105965895 A     9/2016
(Continued)

OTHER PUBLICATIONS

PCT International Search Report & Written Opinion pertaining to International Application No. PCT/US2025/023696; Date of Mailing: Jul. 3, 2025.

(Continued)

*Primary Examiner* — Galen H Hauth
*Assistant Examiner* — Mohamed K Ahmed Ali
(74) *Attorney, Agent, or Firm* — Vorys, Sater, Seymour and Pease LLP

(57)     ABSTRACT

A multi-screw extruder includes a drive mechanism operable to output a torque through a drive shaft, a plurality of extruder screws each operably coupled to the drive shaft to rotate in response to the torque, each of the extruder screws and including a shaft and a thread, an elongated barrel body defining a plurality of isolated screw compartments extending therethrough and each receiving one of the plurality of extruder screws therein, each screw compartment isolated from each of the other screw compartments along a length of the barrel body, a heater substantially circumscribing each of the screw compartments and operable to provide a heat flux into each of the screw compartments, a common collection chamber in fluid communication with each screw compartment, and a nozzle in fluid communication with the common collection chamber including a material outlet through which a molten printing material may be discharged from the extruder.

20 Claims, 4 Drawing Sheets

(51) Int. Cl.

| | |
|---|---|
| *B29C 64/295* | (2017.01) |
| *B29C 64/321* | (2017.01) |
| *B33Y 10/00* | (2015.01) |
| *B33Y 30/00* | (2015.01) |

(52) U.S. Cl.

CPC ............. *B29C 64/321* (2017.08); *B33Y 10/00* (2014.12); *B33Y 30/00* (2014.12)

(58) Field of Classification Search

CPC .... B29C 2948/92161; B29C 2948/922; B29C 2948/9238; B29C 2948/924; B29C 48/266; B29C 48/40; B29C 48/682; B29C 48/683; B29B 7/46

See application file for complete search history.

(56) References Cited

U.S. PATENT DOCUMENTS

| | | | |
|---|---|---|---|
| 2017/0291364 | A1 | 10/2017 | Womer |
| 2021/0154910 | A1 | 5/2021 | Cheng et al. |
| 2022/0250316 | A1 | 8/2022 | Tobin et al. |
| 2023/0139210 | A1 | 5/2023 | Saurwalt |
| 2023/0286200 | A1 | 9/2023 | Gneuss et al. |
| 2024/0239018 | A1* | 7/2024 | Ohara ...................... B29B 7/48 |

FOREIGN PATENT DOCUMENTS

| | | | | |
|---|---|---|---|---|
| CN | 110450402 | A | 11/2019 | |
| CN | 110978455 | A | 4/2020 | |
| CN | 111601695 | A | 8/2020 | |
| CN | 216068601 | U | 3/2022 | |
| EP | 4126505 | A1 | 2/2023 | |
| KR | 20190031959 | A | 3/2019 | |
| WO | WO-2025202890 | A1 * | 10/2025 | ........... B29C 48/395 |

OTHER PUBLICATIONS

Netto, Joaquim Manoel Justino et al., Design and validation of an innovative 3D printer containing a co-rotating twin screw extrusion unit, Additive Manufacturing, vol. 59, Part B, 2022, 103192, ISSN 2214-8604.

* cited by examiner

202

112

116

"A"

204

206

116

112

"A"

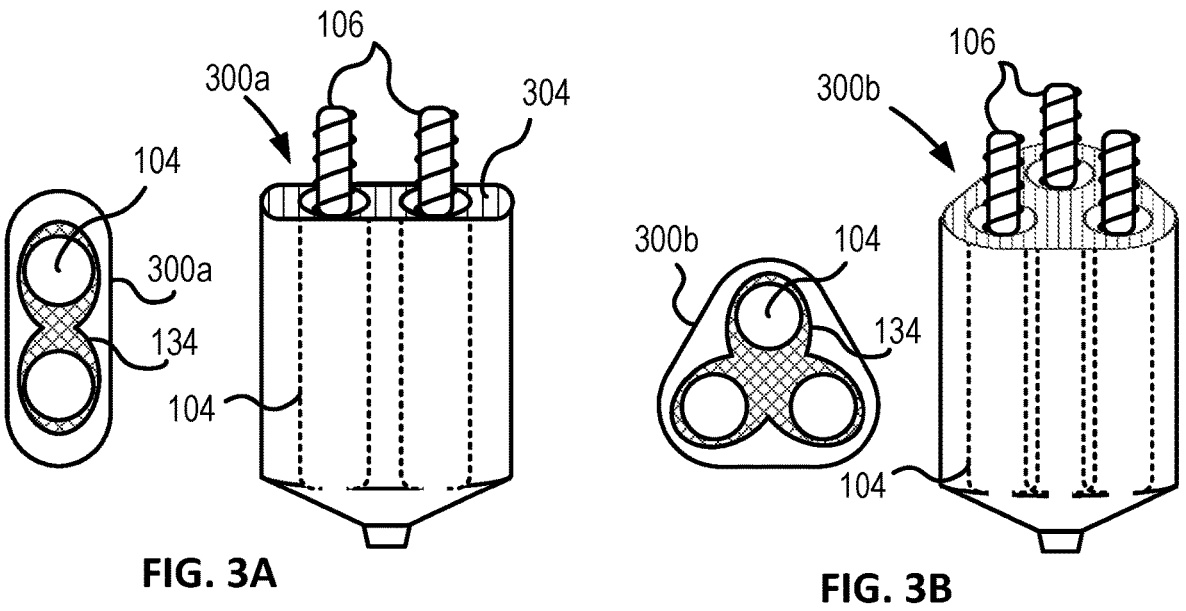
FIG. 3A
FIG. 3B
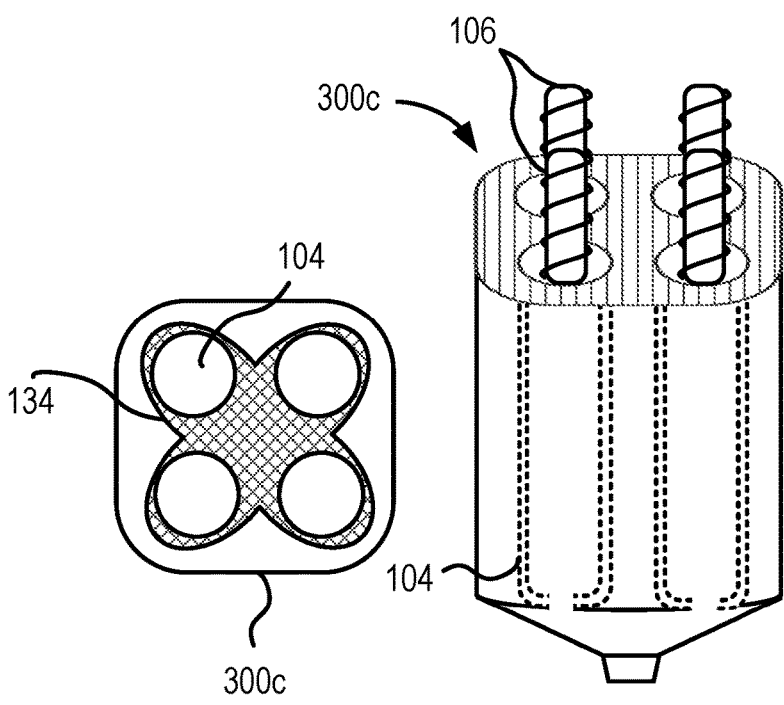
FIG. 3C

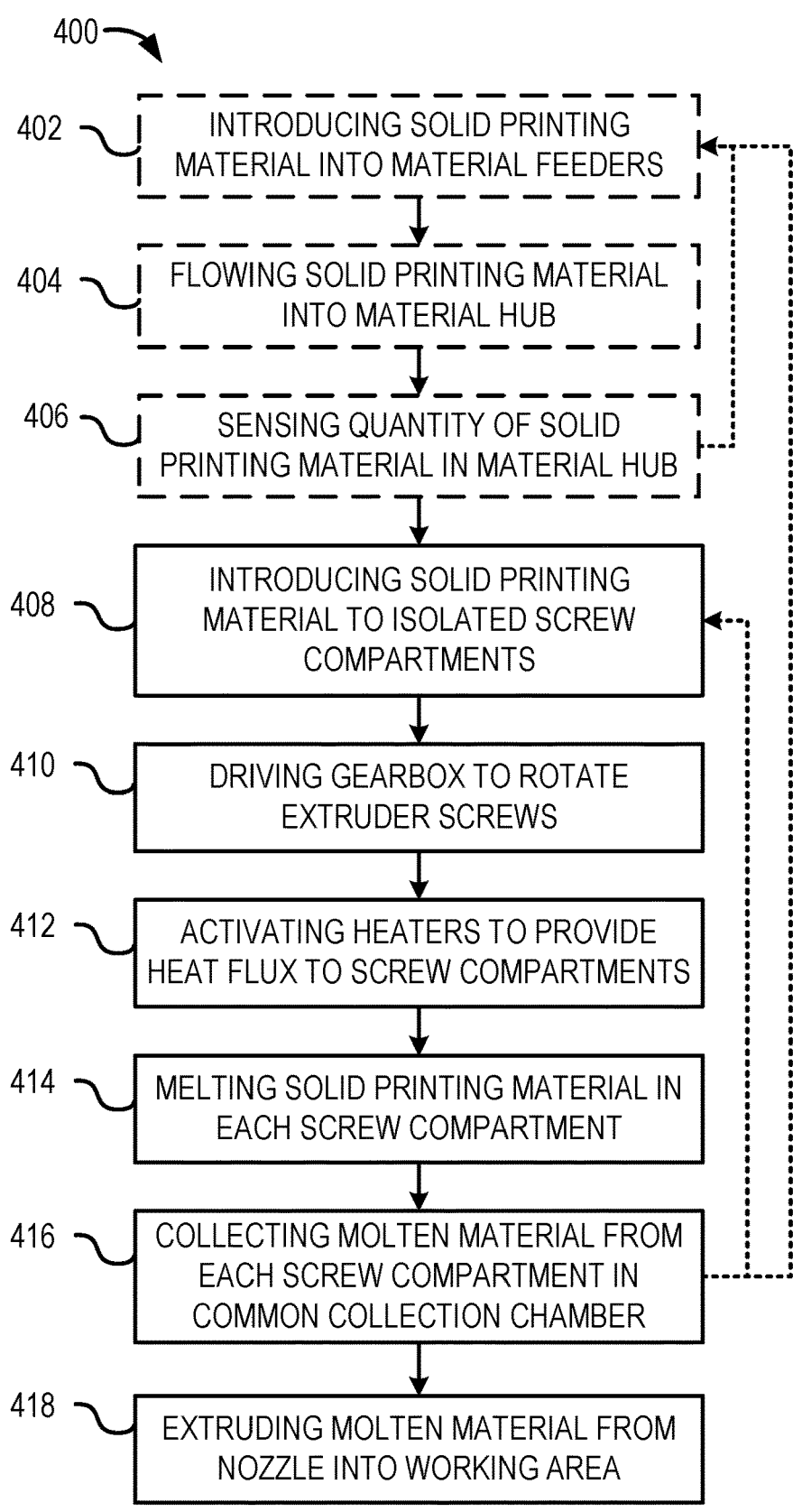

400

402 — INTRODUCING SOLID PRINTING MATERIAL INTO MATERIAL FEEDERS

404 — FLOWING SOLID PRINTING MATERIAL INTO MATERIAL HUB

406 — SENSING QUANTITY OF SOLID PRINTING MATERIAL IN MATERIAL HUB

408 — INTRODUCING SOLID PRINTING MATERIAL TO ISOLATED SCREW COMPARTMENTS

410 — DRIVING GEARBOX TO ROTATE EXTRUDER SCREWS

412 — ACTIVATING HEATERS TO PROVIDE HEAT FLUX TO SCREW COMPARTMENTS

414 — MELTING SOLID PRINTING MATERIAL IN EACH SCREW COMPARTMENT

416 — COLLECTING MOLTEN MATERIAL FROM EACH SCREW COMPARTMENT IN COMMON COLLECTION CHAMBER

418 — EXTRUDING MOLTEN MATERIAL FROM NOZZLE INTO WORKING AREA

FIG. 4

MULTI-SCREW EXTRUDER FOR LARGE FORMAT 3D PRINTERS

FIELD OF THE DISCLOSURE

The present disclosure relates generally to large format three-dimensional (3D) printers and, more particularly, to screw extruders arranged to permit 3D printers to provide increased build volumes and higher flow rates.

BACKGROUND OF THE DISCLOSURE

Large-format three-dimensional (3D) printers can facilitate rapid manufacturing of polymer-based or concrete parts for a variety of applications. Large-format 3D printers may provide a build volume (i.e., the size of a part that the 3D printer can produce) of at least one cubic meter, making these printers useful for the production of large industrial components and structural projects. Often, these printers use an extruder with a single rotating helical screw to advance solid printing materials along a barrel body where the printer materials are heated and melted. Once molten, the printing materials are extruded through a nozzle at the end of the barrel body to form the part. The speed of these large-format 3D printers, however, may be bottlenecked by delays in the melting and extruding of printing materials.

To accelerate manufacturing, the design length of the barrels and rotating screws in the extruders of these large-format 3D printers may be increased. By lengthening the single-screw extruder, a heat transfer area within the extruder is correspondingly lengthened to facilitate a larger heat flux into the printing material. The lengthened extruder can be mounted on a robotic arm or on a 3D gantry system to enable rapid additive manufacturing. However, as the extruder length is increased, the footprint of the large-format 3D printer will similarly increase. As such, the extruder may interfere with the structure of the large-format 3D printer or reduce the build volume provided by the printer. Consequently, the length of these single-screw extruders can be limited by the available space and applications of these large-format 3D printers.

Accordingly, a screw extruder that rapidly melts printing materials within a limited footprint is desirable.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a multi-screw extruder includes a drive mechanism operable to output a torque through a drive shaft, a plurality of extruder screws each operably coupled to the drive shaft to rotate in response to the torque, each of the extruder screws and including a shaft and a thread, an elongated barrel body defining a plurality of isolated screw compartments extending therethrough and each receiving one of the plurality of extruder screws therein, each screw compartment isolated from each of the other screw compartments along a length of the barrel body. The multi-screw extruder further includes at least one heater substantially circumscribing each of the screw compartments and operable to provide a heat flux into each of the screw compartments, a common collection chamber in fluid communication with each screw compartment, and a nozzle in fluid communication with the common collection chamber including a material outlet through which a molten printing material may be discharged from the extruder.

In another embodiment, a method of extruding molten printing material includes introducing a solid printing material to a plurality of isolated screw compartments within a multi-screw extruder, driving a gearbox of the multi-screw extruder to rotate a plurality of extruder screws within each of the isolated screw compartments, and activating a plurality of heaters substantially circumscribing each of the plurality of isolated screw compartments to provide a heat flux into each screw compartment. The method further includes melting the solid printing material into the molten printing material within the plurality of isolated screw compartments, collecting the molten printing material from each of the isolated screw compartments into a common collection chamber, and extruding the molten printing material from a nozzle in fluid communication with the common collection chamber.

In a further embodiment, an extruder barrel assembly includes an elongate barrel body, a plurality of isolated screw compartments distributed throughout an interior of the body, one or more of heaters substantially circumscribing each of the screw compartments and operable to provide a heat flux into each screw compartment, a common collection chamber at a bottom end of the elongate barrel body and in fluid communication with each screw compartment, and a nozzle in fluid communication with the common collection chamber including a material outlet in fluid communication with a working area.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 3A illustrates a top sectional and side view of a two-screw barrel body.

FIG. 3B illustrates a top sectional and side view of a three-screw barrel body.

FIG. 3C illustrates a top sectional and side view of a four-screw barrel body.

FIG. 4 is a flowchart for an example method of extruding molten printing material with a large-format 3D printer, according to at least one embodiment of the present disclosure.

DETAILED DESCRIPTION

Figure 1:
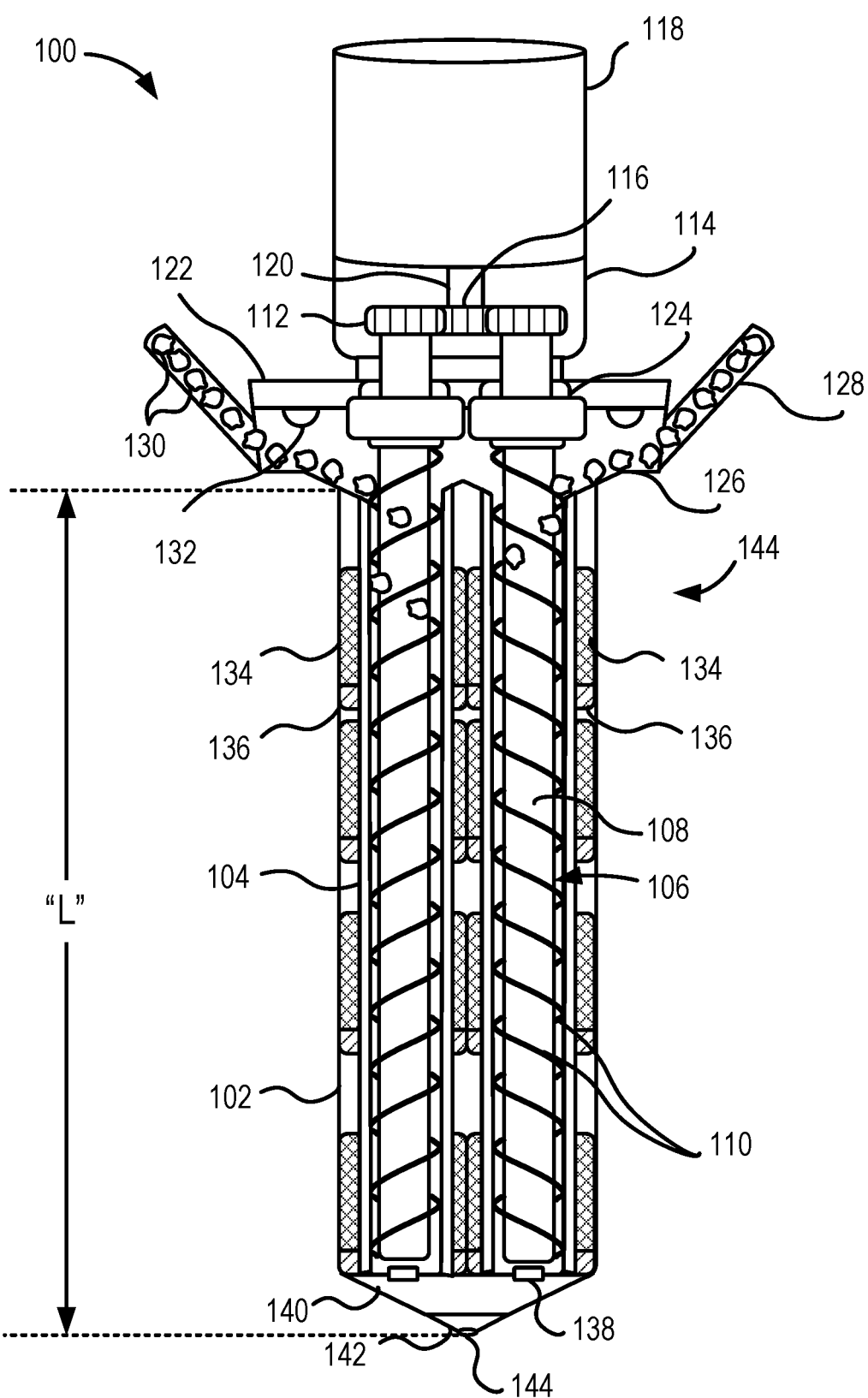
FIG. 1 is a schematic cross-sectional view of a multi-screw extruder including a gearbox operably coupling a motor to a plurality of extruder screws feeding a common collection chamber for rapid additive manufacturing in a large-format 3D printer in accordance with one or more example embodiments of the disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to large format 3D printers and, more particularly, to screw extruders for 3D printers that allow the printers to provide increased build volumes. Embodiments disclosed herein include multi-screw extruder assemblies, methods of multi-screw extrusion, and extruder barrel designs for independently-contained screws in a multi-screw extruder. The embodiments disclosed herein may include a single extruder barrel body with multiple isolated screw compartments defined therein. Printing material within each of the isolated screw compartments may be independently and simultaneously melted. Each isolated screw compartment may be heated by a plurality of heaters that define several heating sections along each extruder screw. The extruder screws may be commonly driven by a singular motor and gearbox, such that rotation of each extruder screw is synchronized for uniform melting and extrusion. In some embodiments, a plurality of sensors may be included to monitor flow rates of printing material into the extruder, as well as to monitor the status and operating parameters of the heaters.

The embodiments disclosed herein include one or more designs that may enable increased print speeds for large-format 3D printers without increasing a designed length of the extruder barrel body and thereby limiting a build volume provided by the printer. Through the inclusion of several independent extruder screw compartments outputting to a common collection chamber, the melt volume of the extruder may be multiplicatively increased without a significant impact to the footprint of the 3D printer. Including multiple heaters for each compartment can provide uniform heating throughout each extruder barrel without the presence of cold spots common in conventional multi-screw extruders with a shared compartment. Accordingly, the embodiments disclosed herein can accelerate the print speeds of large-format 3D printers without a loss of quality or alteration of the control design and footprint.

FIG. 1 is a schematic, partial cross-sectional view of a multi-screw extruder 100 for rapid additive manufacturing in a large-format 3D printer. The multi-screw extruder 100 (hereinafter "the extruder 100") includes a barrel body 102 that may form a central body for the extruder 100. The barrel body 102 may include a plurality of screw compartments 104 defined therein, each sized to receive a discrete extruder screw 106. The screw compartments 104 may be elongate tubular cavities separately defined within the barrel body 102, such that each extruder screw 106 is isolated from the other extruder screws 106 in the corresponding screw compartments 104. In some embodiments, the number of extruder screws 106 and screw compartments 104 may range from 2 to 4 of each component. However, those skilled in the art will readily appreciate that there may be no theoretical upper limit to the number of extruder screws 106 and screw compartments 104.

Each extruder screw 106 may include a screw shaft 108 which may extend partially within a corresponding screw compartment 104. Each screw shaft 108 may support a plurality of threads 110 that project radially from the screw shaft 108 and towards an inner circumferential surface of the screw compartment 104. In some embodiments, the screw compartments 104 are integrally formed within the barrel body 102, such that the barrel body 102 defines a plurality of voids in which the extruder screws 106 may be housed.

An upper end of each screw shaft 108 may terminate at a screw gear 112 configured to transfer torque to the extruder screw 106. In some embodiments, the screw gear 112 may be coupled to the screw shaft 108 with a set screw (not shown) or other fastener, and in other embodiments, the screw gear 112 may be formed monolithically with the screw shaft 108. In some embodiments, each screw gear 112 may be included within a gearbox 114 positioned above or elsewhere outside the barrel body 102. The gearbox 114 may further house a drive gear 116, which may transmit torque from a drive mechanism 118 to the screw gears 112. In the illustrated embodiment, the drive mechanism is a motor 118 mounted to a top of the gearbox 114 and including a drive shaft 120 mated to the drive gear 116. The motor 118 may transmit torque to the drive shaft 120 and the mated drive gear 116 to provide torque to the extruder screws 106 via the screw gears 112 and thereby initiate rotation of the extruder screws 106.

While the illustrated embodiment includes the motor 118 and gearbox 114 positioned above the barrel body 102, those skilled in the art will readily appreciate that alternate configurations of the extruder 100 may be possible which include the motor 118 and gearbox 114 at differing locations, angles, and orientations without departing from the scope of this disclosure.

Figure 2A:
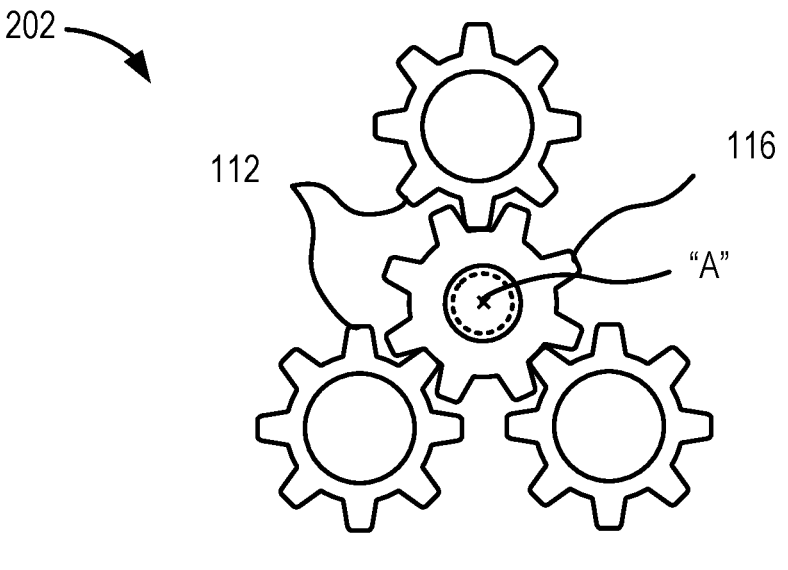
FIG. 2A illustrates a central-drive gearbox orientation for the gearbox of FIG. 1 with a centrally-positioned drive gear.
Figure 2B:
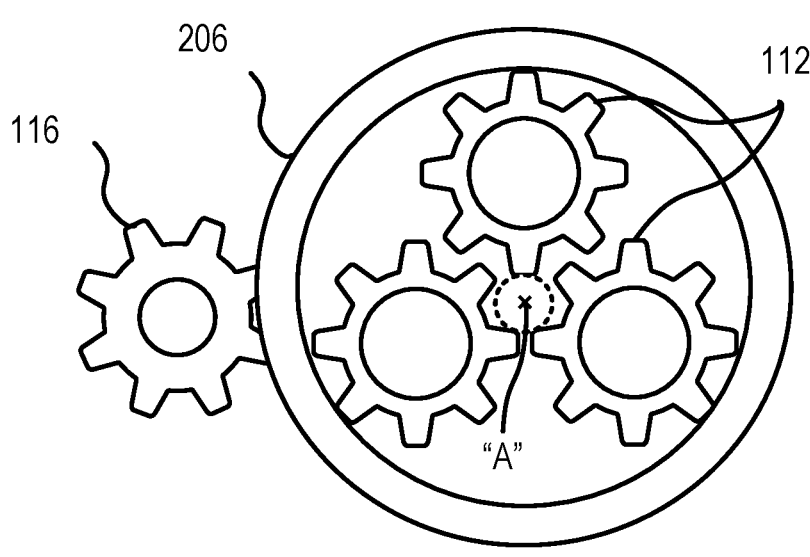
FIG. 2B illustrates an alternate planetary gearbox orientation for the gearbox of FIG. 1 with an axially-offset drive gear.

Referring now briefly to FIGS. 2A-2B, two alternate orientations 202, 204 of the gears 112, 116 in the gearbox 114 (FIG. 1) are illustrated. Both orientations 202, 204 in FIG. 2A-2B are shown with three screw gears 112, however, as discussed above alternate embodiments may include any number of screw gears 112 greater than two.

FIG. 2A illustrates a central-drive gearbox orientation 202 with a centrally-positioned drive gear 116. The three screw gears 112 are circumferentially spaced from one another around the drive gear 116, which is centered on a central axis "A". The centrally-positioned drive gear 116 may be directly meshed with the screw gears 112, such that driving the centrally-positioned drive gear will directly drive each screw gear 112 and simultaneous rotate each extruder screw 106 (FIG. 1). With the central-drive gearbox orientation 202, the motor 118 (FIG. 1) may be centrally located above the drive gear 116, and above and between each of the extruder screws 106 driven by the screw gears 112.

FIG. 2B illustrates a planetary gearbox orientation 204 with the drive gear 116 axially offset from a collective center of the screw gears 112. The planetary gearbox orientation 204 may enable the motor 118 of FIG. 1 to be offset from the central axis "A" between the extruder screws 106 (FIG. 1). In the planetary gearbox orientation 204, the motor 118 (FIG. 1) may be axially aligned with the drive gear 116, and thus, the planetary gearbox orientation 204 may enable an alternate placement of the motor 118 for space-saving or operationally-dependent purposes. As illustrated, the planetary gearbox orientation 204 may include a planetary gear 206 surrounding each of the screw gears 112, such that each screw gear 112 is at least partially meshed with an inner surface of the planetary gear 206. The axially-offset drive gear 116 may be at least partially meshed with an outer surface of the planetary gear 206. In operation, the axially-offset drive gear 116 may be driven to rotate the planetary gear 206, which in turn may drive rotation of the screw gears 112 to provide rotation to each extruder screw 106 (FIG. 1).

Returning to FIG. 1, the gearbox 114 may be mated to a bearing housing 122 on a bottom end of the gearbox 114 opposite of the motor 118. The bearing housing 122 may include a plurality of bearings 124 therein, and each extruder screw 106 may extend through the bearing housing 122 between the gearbox 114 and the screw compartment 104. The bearings 124 may include thrust bearings, radial bearings, or a combination thereof. Thrust bearings may be included as bearings 124 to enable rotation of the screw gears 112 and drive gear 116, as well as to enable rotation of the extruder screws 106. Radial bearings may be included as bearings 124 to maintain a central position of each extruder screw 106 in the corresponding screw compartment 104. Accordingly, a preferred embodiment may include both thrust and radial bearings as bearings 124 to provide smooth rotation and limit translation of the extruder screws 106 during operation of the extruder 100.

The extruder 100 may further include a material hub 126 interposing the barrel body 102 and the bearing housing 122. The material hub 126 may be formed of a material capable of withstanding large heat and pressure values, and may provide a flowpath into the screw compartments 104 of the barrel body 102. The material hub 126 may include one or more material feeders 128 that provide flowpaths for printing material 130 to enter the material hub 126 in a solid form from an external source (not shown). The material feeders 128 may provide the printing material 130 into the material hub 126 such that the printing material 130 may flow therethrough and into each of the screw compartments 104. The material feeders 128 may be controlled to provide a desired flowrate of printing material 130 into the material hub 126 to ensure consistent feed of the printing material 130 without overflow or blockage within the material hub 126.

In some embodiments, the material hub 126 may further include one or more material sensors 132. The material sensors 132 may sense and detect a level of printing material 130 present within the material hub 126. The readings of the material sensors 132 may be utilized in controlling the material feeders 128, such that a flowrate of the printing material 130 may be tuned or adjusted to maintain an optimal level of printing material 130 within the material hub 126. In some embodiments, the material sensors 132 may optically or sonically detect the printing material 130, may sense a total weight of the printing material 130 present within the material hub 126, or may utilize magnetic fields or pneumatic flows to detect amount of printing material 130 obstructing the material sensors 132. The material sensors 132 may be chosen to be compatible with a chosen printing material 130, such that a plastic proximity sensor may be used when a plastic printing material is utilized, as a non-limiting example.

The printing material 130 may flow from the material hub 126 into the screw compartments 104 to be received within and travel through the barrel body 102. The screw shaft 108 and threads 110 may be sized to accommodate the solid printing material 130 both between the threads 110 and between the screw shaft 108 and an inner circumferential surface of the screw compartments 104. The extruder screws 106 may accordingly provide a helical path for the printing material 130 to travel through the screw compartment 104, and this travel may be driven by rotation of the extruder screws 106.

The extruder 100 may further include a plurality of heaters 134 distributed axially along the length "L" of the barrel body 102. The heaters 134 may provide heat to the screw compartments 104 to melt and make the printing material 130 extrudable as it travels around the extruder screws 106. In the illustrated embodiment, the heaters 134 are provided within the barrel body 102 and substantially surrounding the screw compartments 104. As such, each screw compartment 104 may receive a constant influx of heat (thermal energy) to provide consistent and uniform heating of the printing material 130 as it flows through the screw compartments 104. In further embodiments, however, the heaters 134 may either surround the barrel body 102, or may partially protrude from the barrel body 102.

As the heaters 134 may provide a large amount of heat to the barrel body 102, the barrel body 102 may be formed of a metallic material capable of withstanding high temperatures. The barrel body 102 may be further capable of resisting corrosion, pressure, general wear and tear, and other operational hazards that may be present during operation.

The extruder 100 may further include a plurality of temperature sensors or "thermistors" 136 mated to the screw compartments 104, the heaters 134, or a combination thereof. The thermistors 136 may sense a temperature within the screw compartments 104 and/or the heaters 134, such that the thermistors 136 may be employed in monitoring heat transfer within the extruder 100. The thermistors 136 may enable tuning or adjustment of the heaters 134 to provide a desired heat flux into the screw compartments 104 or to maintain a constant temperature. The thermistors 136 can further enable troubleshooting of the extruder 100, such that any failures of the heaters 134 can be tracked in real-time and addressed.

The heaters 134 may provide heating (thermal energy) to each screw compartment 104, such that the printing material 130 present therein may begin to soften and/or melt. As the printing material 130 becomes molten, rotation of the extruder screws 106 continues to push (impel) the printing material 130 down towards a bottom of the barrel body 102. Each screw compartment 104 may include a material port 138 at a bottom end, which may provide fluid communication between the individual screw compartments 104 and a collection chamber 140. The collection chamber 140 may be common to (i.e., may receive molten printing material 130 from) each individual screw compartment 104, and may form a bottom end of the barrel body 102. The collection chamber 140 may include tapered side walls (e.g., conical) to enable a funneling effect therein, such that the molten printing material 130 may collect near a bottom of the collection chamber 140.

The collection chamber 140 and the barrel body 102 may terminate in a nozzle 142 at a bottom of the barrel body 102. The nozzle 142 may exhibit a tapered shape with a material outlet 144 in fluid communication with a working area (not shown) of the 3D printer where a part may be formed. In some embodiments, flow or flow rate through the nozzle 142 may be directly controlled by pressure within the collection chamber 140. In such embodiments, the rate of rotation of the extruder screws 106 and the melting of the printing material 130 may be performed at such a rate that the collection chamber 140 fills with molten printing material 130. Any further rotation of the extruding screws 106 may add further molten printing material 130 to the collection chamber 140, thus increasing pressure therein. In these embodiments, the pressure may increase in the collection chamber 140 until the material is pushed through the nozzle 142 by a pressure difference between the collection chamber 140 and the external working area (not shown). In further embodiments, however, flow or flow rate through the nozzle 142 may be controlled electronically by a print controller (not shown) or an operator to start and stop extrusion therefrom.

The components of the extruder 100 below the material hub 126 may be referred to herein as "an extruder barrel assembly 144". The extruder barrel assembly 144 may be designed to incorporate a number of screw compartments 104 in a desired layout and with a desired number of heaters 134. The extruder barrel assembly 144 may at least include the barrel body 102, the screw compartments 104, the heaters 134, the collection chamber 140, and the nozzle 142. In further embodiments however, the extruder barrel assembly 144 may include the thermistors 136 and any further components included within the extruder 100.

Through the use of a plurality of extruder screws 106 each housed within an individual screw compartment 104, the extruder 100 may multiplicatively increase the melt volume for a large-format 3D printer without drastically increasing a height, length or other dimensions of the barrel body 102. Moreover, the heaters 134 may enable uniform heating of the printing material 130 within the compartments 140 without the presence of cold zones commonly found in traditional extruders. As such, the extruder 100 may increase the extrusion rate of printing material 130 therethrough without increasing the length "L" of the barrel body 102 and without negatively impacting heat uniformity therein. The extruder 100 may accordingly enable increased printing speeds for large-format 3D printers while maintaining a similar footprint.

FIGS. 3A-3C illustrate examples of individual barrel bodies 300a, 300b, and 300c, including a varying number of extruder screws 106 inserted therein. The barrel bodies 300a-c shown in FIGS. 3A-3C are non-limiting examples of possible designs to be used in construction of the extruder 100 of FIG. 1. However, those skilled in the art will readily appreciate that alternative designs may be possible which enable multiple screws in a single barrel with uniform heating that are not shown here, without departing from the scope of this disclosure.

FIG. 3A illustrates a top sectional and side view of a two-screw barrel body 300a. The top sectional view 302a shows the barrel body 300a surrounding two distinct screw compartments 104 in a rounded rectangular shape, with enough surrounding material to accommodate heaters 134 around each screw compartment 104. As shown in the top sectional view, the heaters 134 substantially circumscribe (surround) each screw compartment 104, such that a majority (or all) of an outer surface of each screw compartment 104 is engaged with the heaters 134. In some embodiments, the entire outer surface of each screw compartment 104 may be engaged with the heaters 134 to further enhance heating therein. The side view shows two extruder screws 106 protruding from the barrel body 300a, while further illustrating the screw compartments 104 (in dashed lines) through the barrel body 300a.

FIG. 3B illustrates a top sectional and side view of a three-screw barrel body 300b. The top sectional view shows the barrel body 300b surrounding three distinct screw compartments 104 in a rounded triangular shape, with enough surrounding material to accommodate heaters 134 around each screw compartment 104. The side view shows three extruder screws 106 protruding from the barrel body 300b, while further illustrating the screw compartments 104 (in dashed lines) through the barrel body 300b.

FIG. 3C illustrates a top sectional and side view of a four-screw barrel body 300c. The top sectional view shows the barrel body 300c surrounding four distinct screw compartments 104 in a rounded rectangular, or rounded square, shape, with enough internal space to accommodate heaters 134 around each screw compartment 104. The side view shows four extruder screws 106 protruding from the barrel body 300c, while further illustrating the screw compartments 104 (in dashed lines) through the barrel body 300c.

FIG. 4 is a flowchart for an example method 400 of extruding molten printing material for a large-format 3D printer, according to at least one embodiment of the present disclosure. The method 400 may be implemented by the extruder 100 and any of the design possibilities of FIGS. 2A-3C. Thus, reference can be made to the example of FIGS. 1-3C in the example of FIG. 4. The method 400 may optionally begin at 402 with introducing a solid printing material (e.g., the printing material 130) into one or more material feeders (e.g., the material feeders 128). The solid printing material may be sourced from a common material source in communication with each material feeder. The material feeders, or the common material source, may be actively controlled to start and stop flow of the solid printing material into the material feeders. The method 400 may optionally continue at 404 with flowing the solid printing material from the material feeders into a material hub (e.g., the material hub 126). The material hub may receive the solid printing material and may funnel, or otherwise guide, the solid printing material towards one or more isolated screw components of the extruder (e.g., the screw compartments 104). The method 400 may further optionally continue at 406 with sensing a quantity of solid printing material within the material hub via a material sensor (e.g., the material sensor 132). The material sensor may detect a weight or volume of the solid printing material currently within the material hub to determine any tuning or adjustments to be performed with respect to the flow of solid printing material through the material feeders. In some cases, an inadequate amount of solid printing material may be detected within the material hub for a desired extrusion rate. In these cases, the method 400 may continue at 402 with introducing further solid printing material into the material feeders, such that solid printing material may be continuously added until a desired level is reached.

The method 400 may continue at 408 with introducing the solid printing material into the plurality of isolated screw compartments within the extruder. The isolated screw compartments may each include an extruder screw (e.g., the extruder screw 106) therein including a shaft and a thread (e.g., the shaft 108 and thread 110) sized to retain and advance the solid printing material through the screw compartment. The method 400 may continue at 410 with driving a gearbox (e.g., the gearbox 114) of the extruder to rotate the plurality of extruder screws within each of the isolated screw compartments. In some embodiments, the driving of the gearbox at 410 may be performed with a drive mechanism, such as a motor (e.g., the motor 118). The gearbox may include gears in a central or offset arrangement to enable a variety of orientations of the drive mechanism. The induced rotation of the extruder screws may begin to force the solid printing material downward through the screw compartment. In some embodiments, the driving of the gearbox at 410 may be accompanied by stabilizing the extruder screws via a plurality of bearings (e.g., the bearings 124) housed within a bearing housing (e.g., the bearing housing 122). The plurality of bearings may include both thrust and radial bearings to enable rotation and to maintain stability of the extruder screws within the screw compartments.

The method 400 may continue at 412 with activating a plurality of heaters (e.g., the heaters 134) surrounding each of the plurality of isolated screw compartments to provide a heat flux into the screw compartments. The heaters may be provided in a plurality of zones down the length of the screw compartments to provide consistent or staged heating of the solid printing material as it travels downward. The heaters may be coupled to thermistors (e.g., the thermistors 136) to sense and monitor the heat output or temperature of the heaters during operation. Accordingly, the heaters may be actively or autonomously controlled based upon signals from the thermistors. The method 400 may continue at 414 with melting the solid printing material into molten printing material within the plurality of isolated screw compartments. As the solid printing material passes through the screw compartment and receives heat from the heaters, the solid printing material may soften and melt into a pliable molten form. The molten printing material may continue to flow through the screw compartment and may be driven by further rotation of the extruder screws.

The method 400 may continue at 416 with collecting the molten printing material from each of the isolated screw compartments into a common collection chamber (e.g., the collection chamber 140). The common collection chamber may receive the molten printing material from a material port (e.g., the material port 138) of each screw compartment, and may collect all molten printing material in a single container. The collection chamber may include slanted walls to funnel the molten printing material towards a bottom of the collection chamber. In some embodiments, an insufficient amount of molten material may be present within the collection chamber. As such, the method 400 may return to 402 or 408 to provide further solid printing material to either the material feeders or directly into the screw compartments. The method 400 may then continue cyclically with further melting and driving of the printing material to the common collection chamber.

The method 400 may continue at 418 with extruding the molten printing material from a nozzle (e.g., the nozzle 142) in fluid communication with the common collection chamber into a working area. The collected molten printing material may be received within the nozzle and may be driven out of a material outlet (e.g., the material outlet 144) at the tip thereof. In some embodiments, continued collection of molten printing material in the common collection chamber may increase a pressure therein. The increased pressure within the extruder may drive the molten printing material towards the lower-pressure environment of the working area, such that extrusion is facilitated by continued operation of the drive mechanism.

Embodiments disclosed herein include:

A. A multi-screw extruder including a drive mechanism operable to output a torque through a drive shaft, a plurality of extruder screws each operably coupled to the drive shaft to rotate in response to the torque, each of the extruder screws and including a shaft and a thread, an elongated barrel body defining a plurality of isolated screw compartments extending therethrough and each receiving one of the plurality of extruder screws therein, each screw compartment isolated from each of the other screw compartments along a length of the barrel body, at least one heater substantially circumscribing each of the screw compartments and operable to provide a heat flux into each of the screw compartments, a common collection chamber in fluid communication with each screw compartment, and a nozzle in fluid communication with the common collection chamber including a material outlet through which a molten printing material may be discharged from the extruder.

B. A method of extruding molten printing material includes introducing a solid printing material to a plurality of isolated screw compartments within a multi-screw extruder, driving a gearbox of the multi-screw extruder to rotate a plurality of extruder screws within each of the isolated screw compartments, activating a plurality of heaters substantially circumscribing each of the plurality of isolated screw compartments to provide a heat flux into each screw compartment, melting the solid printing material into the molten printing material within the plurality of isolated screw compartments, collecting the molten printing material from each of the isolated screw compartments into a common collection chamber, and extruding the molten printing material from a nozzle in fluid communication with the common collection chamber.

C. An extruder barrel assembly including an elongate barrel body, a plurality of isolated screw compartments distributed throughout an interior of the body, one or more of heaters substantially circumscribing each of the screw compartments and operable to provide a heat flux into each screw compartment, a common collection chamber at a bottom end of the elongate barrel body and in fluid communication with each screw compartment, and a nozzle in fluid communication with the common collection chamber including a material outlet in fluid communication with a working area.

Each of embodiments A through C may have one or more of the following additional elements in any combination: Element 1: further comprising a thermistor coupled to each heater and operable to sense a temperature, a heat flux, or a combination thereof of the heater. Element 2: further comprising a material hub coupled to the elongated barrel body at an upper end, the material hub including one or more material feeders providing flowpaths for a printing material to enter the material hub. Element 3: further comprising a material sensor included within the material hub and operable to detect a level of printing material present within the material hub. Element 4: further comprising a bearing housing interposing the gearbox and the material hub and including a plurality of bearings mated with the extruder screws. Element 5: wherein the plurality of bearings include radial bearings and thrust bearings. Element 6: further comprising a gearbox interposing the drive mechanism and including a drive gear rotationally coupled to one or more screw gears mated to each extruder screw. Element 7: wherein the gearbox is a central-drive gearbox with the drive gear centrally located between each of the screw gears. Element 8: herein the gearbox is a planetary gearbox including a planetary gear surrounding the screw gears and meshed on an outer surface with the drive gear.

Element 9: further comprising increasing a pressure within the common collection chamber to drive the extruding of the molten printing material from the nozzle. Element 10: further comprising sensing a temperature, a heat flux, or a combination thereof from the plurality of heaters via a plurality of thermistors coupled thereto. Element 11: further comprising introducing the solid printing material into one or more material feeders, and flowing the solid printing material from the material feeders into a material hub above each of the isolated screw compartments. Element 12: further comprising sensing, via a material sensor within the material hub, a quantity of solid printing material introduced by the material feeders. Element 13: further comprising controlling an amount of solid printing material introduced via the material feeders based on the quantity of solid printing material sensed via the material sensor. Element 14: further comprising stabilizing the plurality of extruder screws within the extruder via a plurality of thrust and radial bearings within a bearing housing. Element 15: wherein the elongate barrel body is in the shape of a rounded rectangle and includes two screw compartments equally spaced within the body. Element 16: wherein the elongate barrel body is in the shape of a rounded triangle and includes three screw compartments equally spaced radially about a central axis of the body. Element 17: further comprising a thermistor coupled to each heater and operable to sense a temperature, a heat flux, or a combination thereof of each heater.

By way of non-limiting example, exemplary combinations applicable to A through C include: Element 2 with Element 3; Element 2 with Element 4; Element 4 with Element 5; Element 6 with Element 7; Element 6 with Element 8; Element 11 with Element 12; and Element 12 with Element 13.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A multi-screw extruder comprising:
   a drive mechanism operable to output torque through a drive shaft;
   a plurality of extruder screws each operably coupled to the drive shaft to rotate in response to the torque, each of the extruder screws including a shaft and a thread extending about the shaft;
   an elongated barrel body defining a plurality of isolated screw compartments extending therethrough and each isolated screw compartment receiving a corresponding one of the plurality of extruder screws, each isolated screw compartment being an independent elongate cavity defined through a length of the barrel body;
   at least one heater substantially circumscribing each isolated screw compartment and operable to provide a heat flux into each isolated screw compartment;
   a common collection chamber in fluid communication with each isolated screw compartment; and
   a nozzle in fluid communication with the common collection chamber and defining a material outlet through which a molten printing material may be discharged from the extruder.

2. The multi-screw extruder of claim 1, further comprising a thermistor coupled to each heater and operable to sense at least one of a temperature, a heat flux, or a combination thereof of the at least one heater.

3. The multi-screw extruder of claim 1, further comprising a material hub arranged at an upper end of the barrel body and including one or more material feeders providing flowpaths for the printing material to enter the material hub.

4. The multi-screw extruder of claim 3, further comprising a material sensor operable to detect a level of printing material present within the material hub.

5. The multi-screw extruder of claim 3, further comprising a gearbox and a bearing housing, wherein the bearing housing interposes the gearbox and the material hub and includes a plurality of bearings engageable with the extruder screws.

6. The multi-screw extruder of claim 5, wherein the plurality of bearings includes radial bearings and thrust bearings.

7. The multi-screw extruder of claim 1, further comprising a gearbox including a drive gear engageable with a screw gear forming part of each extruder screw.

8. The multi-screw extruder of claim 7, wherein the gearbox is a central-drive gearbox and the drive gear is centrally located and interposes the screw gears of each extruder gear.

9. The multi-screw extruder of claim 7, wherein the gearbox is a planetary gearbox including a planetary gear surrounding the screw gears and engageable with the drive gear on an outer surface of the planetary gear.

10. A method of extruding molten printing material, the method comprising:
   introducing a solid printing material to a plurality of isolated screw compartments within a multi-screw extruder;
   driving a gearbox of the multi-screw extruder and thereby rotating a plurality of extruder screws, wherein a corresponding one of the plurality of extruder screws is located in each isolated screw compartment, each isolated screw compartment being an independently-defined elongate cavity;

activating a plurality of heaters substantially circumscribing each isolated screw compartment and thereby providing a heat flux into each isolated screw compartment;

melting the solid printing material into the molten printing material within the plurality of isolated screw compartments;

collecting the molten printing material in a common collection chamber from each isolated screw compartment; and extruding the molten printing material from a nozzle in fluid communication with the common collection chamber.

11. The method of claim 10, further comprising increasing a pressure within the common collection chamber to drive the extruding of the molten printing material from the nozzle.

12. The method of claim 10, further comprising sensing at least one of a temperature, a heat flux, and a combination thereof from the plurality of heaters via a plurality of thermistors.

13. The method of claim 10, further comprising:

introducing the solid printing material into one or more material feeders; and flowing the solid printing material from the material feeders into a material hub arranged above each isolated screw compartment.

14. The method of claim 13, further comprising sensing, via a material sensor within the material hub, a quantity of solid printing material introduced by the material feeders.

15. The method of claim 14, further comprising controlling an amount of solid printing material introduced via the material feeders based on a quantity of solid printing material sensed via the material sensor.

16. The method of claim 10, further comprising stabilizing the plurality of extruder screws within the extruder via a plurality of thrust and radial bearings housed within a bearing housing.

17. An extruder barrel assembly comprising:

an elongate barrel body;

a plurality of isolated screw compartments distributed throughout an interior of the body, each isolated screw compartment being an independent elongate cavity defined through a length of the elongate barrel body;

one or more of heaters substantially circumscribing each screw compartment and operable to provide a heat flux into each isolated screw compartment;

a common collection chamber provided at a bottom end of the elongate barrel body and in fluid communication with each isolated screw compartment; and a nozzle in fluid communication with the common collection chamber and providing a material outlet in fluid communication with a working area.

18. The extruder barrel assembly of claim 17, wherein the elongate barrel body is in the shape of a rounded rectangle and the plurality of isolated screw compartments comprise two isolated screw compartments equally spaced within the body.

19. The extruder barrel assembly of claim 17, wherein the elongate barrel body is in the shape of a rounded triangle and the plurality of isolated screw compartments comprise three isolated screw compartments equally spaced radially about a central axis of the body.

20. The extruder barrel assembly of claim 17, further comprising a thermistor coupled to each heater and operable to sense at least one of a temperature, a heat flux, and a combination thereof of each heater.

* * * * *